United States Patent
Nellutla et al.

(10) Patent No.: US 12,518,474 B2
(45) Date of Patent: Jan. 6, 2026

(54) TRANSFORM AWARE BLEND OBJECT GENERATION

(71) Applicant: Adobe Inc., San Jose, CA (US)

(72) Inventors: Aditya Nellutla, Bangalore (IN); Apurva Kumar, Bihar (IN)

(73) Assignee: Adobe Inc., San Jose, CA (US)

( * ) Notice: Subject to any disclaimer, the term of this patent is extended or adjusted under 35 U.S.C. 154(b) by 347 days.

(21) Appl. No.: 17/894,965

(22) Filed: Aug. 24, 2022

(65) Prior Publication Data
US 2024/0070975 A1 Feb. 29, 2024

(51) Int. Cl.
*G06T 15/50* (2011.01)
*G06T 3/4007* (2024.01)

(52) U.S. Cl.
CPC .......... *G06T 15/503* (2013.01); *G06T 3/4007* (2013.01)

(58) Field of Classification Search
None
See application file for complete search history.

(56) References Cited

U.S. PATENT DOCUMENTS

| | | | | |
|---|---|---|---|---|
| 6,573,890 B1* | 6/2003 | Lengyel | ................. | G06T 17/20 345/418 |
| 2009/0097744 A1* | 4/2009 | Schultz | ............... | H04N 1/6077 382/167 |
| 2009/0309877 A1* | 12/2009 | Snyder | ................... | G06T 15/60 345/426 |
| 2014/0006548 A1* | 1/2014 | Tsolis | ................. | G06F 16/9577 709/217 |
| 2014/0133748 A1* | 5/2014 | Wright | ................... | G06T 11/00 382/167 |

OTHER PUBLICATIONS

Modeling and Correspondence of Topologically Complex 3D Shapes. Alhashim. (Year: 2015).*

* cited by examiner

*Primary Examiner* — Delomia L Gilliard
(74) *Attorney, Agent, or Firm* — Nicholson De Vos Webster & Elliott LLP

(57) ABSTRACT

Embodiments are disclosed for blending complex objects. The method may include identifying a first complex object and a second complex object. A first primary object associated with the first complex object and a first sequence of geometric repeat operations are determined. A second primary object associated with the second complex object and second sequence of geometric repeat operations are also determined. A blending operation is applied to the first primary object and the second primary object to generate one or more intermediate primary objects. One or more intermediate complex objects are generated from the one or more intermediate primary objects.

20 Claims, 9 Drawing Sheets

TRANSFORM AWARE BLEND OBJECT GENERATION

BACKGROUND

In graphics design applications, repeat transforms are increasingly popular features that provide creative ability to generate complex designs. To create the complex designs, a simple primary object is replicated or transformed using a geometric pattern to form a complex object. A repeat transform defines the geometric pattern that is applied to the primary object. For instance, one type of repeat transform is a radial repeat that replicates the primary object around a circle like spokes of a wheel. The combination of the primary object and the series of transforms create a complex object. The use of repeat transforms reduces the time to create complex designs significantly.

SUMMARY

Introduced here are techniques/technologies that relate to blending complex objects that are formed by applying repeat transformations to simple objects. A complex object is an object made of a repeating geometric shape (referred to as a "primary object"). To perform an accurate blending of two complex objects, the system identifies a primary object from each of the complex objects and the type of repetitions (e.g., radial, mirror, etc.) that are used to form each of the complex objects from the respective primary objects. Primary objects can be blended to create a number of intermediate objects. The number of intermediate objects can represent intermediate interpolations that represent particular blending steps and can be configured as desired. The interpolations can be a linear interpolation using the repeat sequence of the first complex object as the starting point and the repeat sequence of the second complex object as the end point. By using the primary object and intermediate primary objects, the system is able to provide accurate blending of the complex objects that does not distort the intermediate shapes.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

Figure 1:
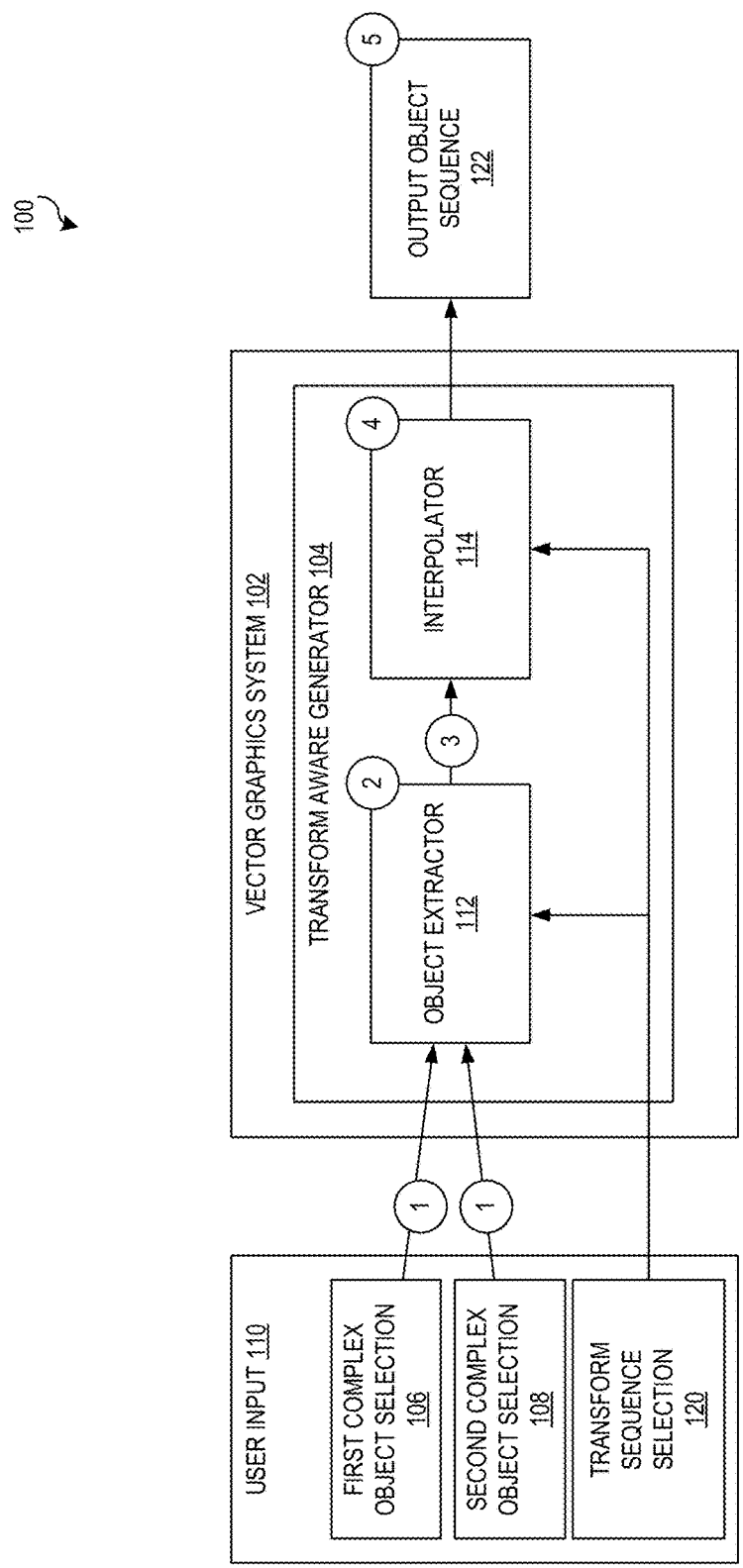
FIG. 1 illustrates a diagram of a process of transform aware blend object generation in accordance with one or more embodiments.

One or more embodiments of the present disclosure include a vector graphics system including a transform aware generator that generates an output object sequence representing a blending of two complex objects. Current approaches for repeat transforms are limited when it comes to applying various effects or performing blend operations. Blending operations are commonly used for simple objects but are quite challenging for complex objects that are formed using a series of repeat transforms. In particular, challenges of working with blending complex objects with repeat transforms involve erroneous replications as the objects can be broken into individual objects or loss of fidelity of the repeat transforms if the entire object is blended. The weakness of conventional approaches is particularly problematic when nested repeat transforms are performed because as the number of repeat transforms increases, the intricacy of the complex object increases, and conventional blends lose fidelity of each repeat transform. This restricts designers to work on some complex use cases involving both repeats and blends.

As discussed, conventional techniques lack the ability to accurately perform blending operations on complex objects as either the fidelity of the components or the arrangement of the complex object is lost. As a result, conventional systems break the complex object into individual objects that cannot be recovered into a complex object. This results in an interpolation that does not accurately position shapes for the intermediate objects, object information is lost completely, and the process is not able to handle up-scaling, down-scaling, or other manipulations.

To address these and other deficiencies in conventional systems, embodiments perform the transform generation by determining a primary object for each of the complex objects. To perform the blending, the transform aware generator identifies a primary object and a transform sequence including a series of repeat transforms for each of the two complex objects. A transform sequence includes a series of geometric transformations, such as repeats that are used to form the complex objects from the primary object. To identify each primary object, the transform sequence is inverted to extract each primary object from a corresponding complex object. After the primary objects are identified, the two primary objects are blended to generate a set of intermediate primary objects that represent the primary objects of intermediate complex objects that represent a blended output between the two complex objects. A linear interpolation is applied to the two transform sequences to represent intermediate series of repeat transforms that can be applied to the intermediate primary objects to generate an output object sequence that represents a blending of the two complex objects.

The transform generator system then performs interpolation between the primary objects, which preserves the fidelity of each primary object. The result of the interpolation is a set of intermediate primary objects that include blended primary objects between the two primary objects. By performing the interpolation on the primary objects to produce the set of intermediate primary objects, the complex objects will represent accurate intermediate primary objects (e.g., components of the complex objects) even when the geometric repeat operations are applied. The transform generator system determines sequences of geometric repeat operations that are applied to form the complex objects and performs an interpolation between the sequences. The result of interpolating the sequences is a set of intermediate sequences that represent steps between the sequences for each complex object.

The result of interpolating the primary objects and interpolating the sequences is that an intermediate sequence and an intermediate primary object are produced for a number of intermediate steps between the complex objects. Each intermediate sequence is applied to the corresponding intermediate primary object to form each intermediate complex object that represents a blended output between the two complex objects.

For example, the transform generator system receives a selection of a first complex object and a second complex object. For example, the first complex object is an object that is formed by processing a first primary object through a first sequence of geometric repeat operations and the second complex object is another object that is formed by processing a second primary object through a second sequence of geometric repeat operations. The transform generator system determines a shape of the first primary object and the second primary object and performs an interpolation between the first primary object and the second primary object. The interpolation generates intermediate primary objects that are a blend of the first primary object and the second primary object. An interpolation of the sequences of geometric repeat operations is performed to create intermediate sequences that can be applied to the intermediate primary objects. By applying the intermediate sequences to the intermediate primary objects, the transform generator system produces an accurate blending operation of complex objects that preserves the fidelity of the geometric repeats while interpolating on the primary objects.

Embodiments provide accurate blending of complex objects that preserves the appearance of each primary object in the complex object. This blending provides a robust solution that does not lose the intricacy of the complex objects. By blending the primary objects and interpolating the sequences, the output object sequence accurately produces intermediate complex objects that represent blending of the two complex objects. The accuracy is both at the primary object and the sequence level because the primary objects and the sequences are interpolated in separate processes and then combined to produce the intermediate complex objects. Additionally, blending the primary objects and interpolating the sequences provides a solution for handling differences in scaling factors between the two complex objects.

FIG. 1 illustrates a diagram of a process of transform aware blend object generation in accordance with one or more embodiments. As depicted in FIG. 1, a computing environment 100 includes a vector graphics system 102 that includes a transform aware generator 104. The transform aware generator 104 includes an object extractor 112 and an interpolator 114. In some embodiments, the transform aware generator 104 is implemented as a module in a vector graphics processing application or another computing application.

At numeral 1, the transform aware generator 104 obtains a first complex object selection 106, a second complex object selection 108, and a transform sequence selection 120 as part of a user input 110. In an example, the first complex object selection 106 and the second complex object selection 108 are different vector objects that include different primary objects that are each processed using a transform sequence (e.g., geometric repeat transforms identified by the transform sequence selection 120) to generate the first complex object and the second complex object, respectively. The first complex object selection 106 and the second complex object selection 108 indicates a first complex object and a second complex object that are selected for blending by a user from a canvas that is presented in the user interface and includes multiple objects. The transform aware generator 104 analyzes the first complex object selection 106 and the second complex object selection 108 selected by the user to determine a compatibility of the pair of complex objects for blending. The compatibility is determined by comparing the transform sequence identified by the transform sequence selection 120 used to generate the first complex object (i.e., as indicated by first complex object selection 106) with the transform sequence used to generate the second complex object (i.e., as indicated by second complex object selection 108). The transform sequences are compatible if the transform aware generator confirms that the transform sequences contain the identical operations or subsets of the same operations (e.g., one radial repeat is a subset of two radial repeats). An example of the transform sequence selection is a sequential set of selected transforms (e.g., a particular order of transforms) that are associated with forming a complex object. The transform sequence selection includes identifiers of transforms, scaling factors for each transform, and an index that indicates the order of each transform in the sequence.

In some embodiments, the transform aware generator 104 identifies a complex object from one or more objects in a scene. For instance, the user inputs a freeform region selection which includes one or more complex objects. The transform aware generator 104 identifies pairs of complex objects within the freeform region that are compatible to be blended. Each pair of complex objects is compatible for blending when a transform sequence applied to each primary object includes identical operations or a subset of the other transform sequence. A transform sequence can include various repeat transforms such as radial repeats, mirror repeats, or grid repeats.

At numeral 2, an object extractor 112 extracts a primary object from each of the complex objects indicated by the first complex object selection 106 and the second complex object selection 108. The primary object is a base vector shape that forms each complex object after the transform sequence is applied. Additional details about primary objects are described at least with regard to FIGS. 2-3. In some embodiments, the object extractor 112 determines a sequence of repeats included in the transform sequence 120 that indicates geometric repeat operations applied to generate the complex objects indicated by the first complex object selection 106 or the second complex object selection 108. The object extractor 112 generates an inverse transform sequence that includes an inverse sequence of each geometric transform in the transform sequence 120 to identify the primary object of the respective complex object. The object extractor 112 outputs a first primary object corresponding to the first complex object and a second primary object corresponding to the second complex object.

In other embodiments, the object extractor 112 may receive a transform sequence 120 for only one of the complex objects or none of the complex objects. In these embodiments, the object extractor 112 can be configured to perform object detection on the complex object to identify the primary object. The object extractor 112 identifies the primary object by determining a sequence of repeat transforms that can be applied (e.g., in a transform sequence) to the primary object to form the complex object.

In some embodiments, the object extractor 112 can determine a difference between the scale of the first complex object and the second complex object by comparing one or more dimensions of the first complex object and the second complex object or identifying different scaling factors between transform sequence 202 and transform sequence 204. The transform aware generator creates an instance matrix from the scale difference determined by the object extractor 112 to avoid generating inaccurate intermediate complex objects. Because a scaling factor is itself a type of geometric transform, the scaling factors can be interpolated as part of the transform sequence or generated using a linear interpolation between the scaling factors of the first complex object and the second complex object.

In an example, the object extractor 112 determines a scaling factor by identifying a minimum area bounding box of the first complex object and the second complex object. The minimum area bounding box is identified by computing a convex hull of points encompassing each of the first complex object and the second complex object. The convex hull is then rotated along each edge to form an enclosing rectangle for each rotation. The area of the enclosing rectangles is computed and the enclosing rectangle having a minimum area is selected.

The transform aware generator compares the minimum area bounding box for the first complex object and the second complex object. During the comparison, the transform aware generator computes a difference between the minimum area bounding boxes to determine if the difference between dimensions will cause a change in scaling factor of intermediate complex objects that are produced to represent a blended output (i.e., including intermediate scaling of sizes) between the first complex object and the second complex object.

At numeral 3, an interpolator 114 receives each of the primary objects for the first complex object and the second complex object that are identified by the object extractor 112 from the first complex object selection 106 and the second complex object selection 108. The interpolator 114 performs a blending operation on the first primary object and the second primary object. The blending operation includes generating a set of intermediate primary objects using a number of interpolation steps between the first primary object and the second primary object. The interpolator 114 can generate any number of intermediate primary objects by changing the number of interpolation steps between the first primary object and the second primary object. In some embodiments, the interpolator 114 generates an intermediate transform sequence of geometric repeat operations by interpolating between a first transform sequence associated with the first complex object selection 106 and a second transform sequence associated with the second complex object selection 108.

For instance, the first transform sequence may include a single radial repeat in the sequence while the second transform sequence includes two radial repeats and a mirror repeat. The interpolator 114 produces a set of intermediate sequences by interpolating between the first transform sequence and the second transform sequence. In a simple example with three intermediate objects, the interpolator can generate a first intermediate sequence that includes a radial repeat, a second intermediate sequence that includes two radial repeats, and a third intermediate sequence that includes two radial repeats, and a mirror repeat.

At numeral 4, the interpolator 114 generates a series of intermediate complex objects using a combination of an intermediate primary object and a corresponding intermediate sequence as determined above. The interpolator 114 applies the intermediate sequence to the intermediate primary object to generate the intermediate complex object. By applying the intermediate sequence to the intermediate primary objects, the transform aware generator 104 can produce intermediate complex objects that preserve the complexity of the geometric repeat sequence and the fidelity of the individual primary shapes.

By using the number of interpolations between the first complex object and the second complex object and the minimum area bounding boxes computed above, the transform aware generator can determine if a scaling difference between intermediate objects will be within a threshold difference. The threshold difference represents a maximum change in size between each interpolation before an updated instance transformation matrix will be computed. The transform aware generator applies the instance transformation matrix to the intermediate complex objects after the interpolator has generated the intermediate complex objects using the intermediate primary object and the intermediate sequence.

At numeral 5, the transform aware generator 104 outputs an output object sequence 122 such as to a presentation device or client device. In some embodiments, the transform aware generator can store the output object sequence 122 in a memory device.

Figure 2:
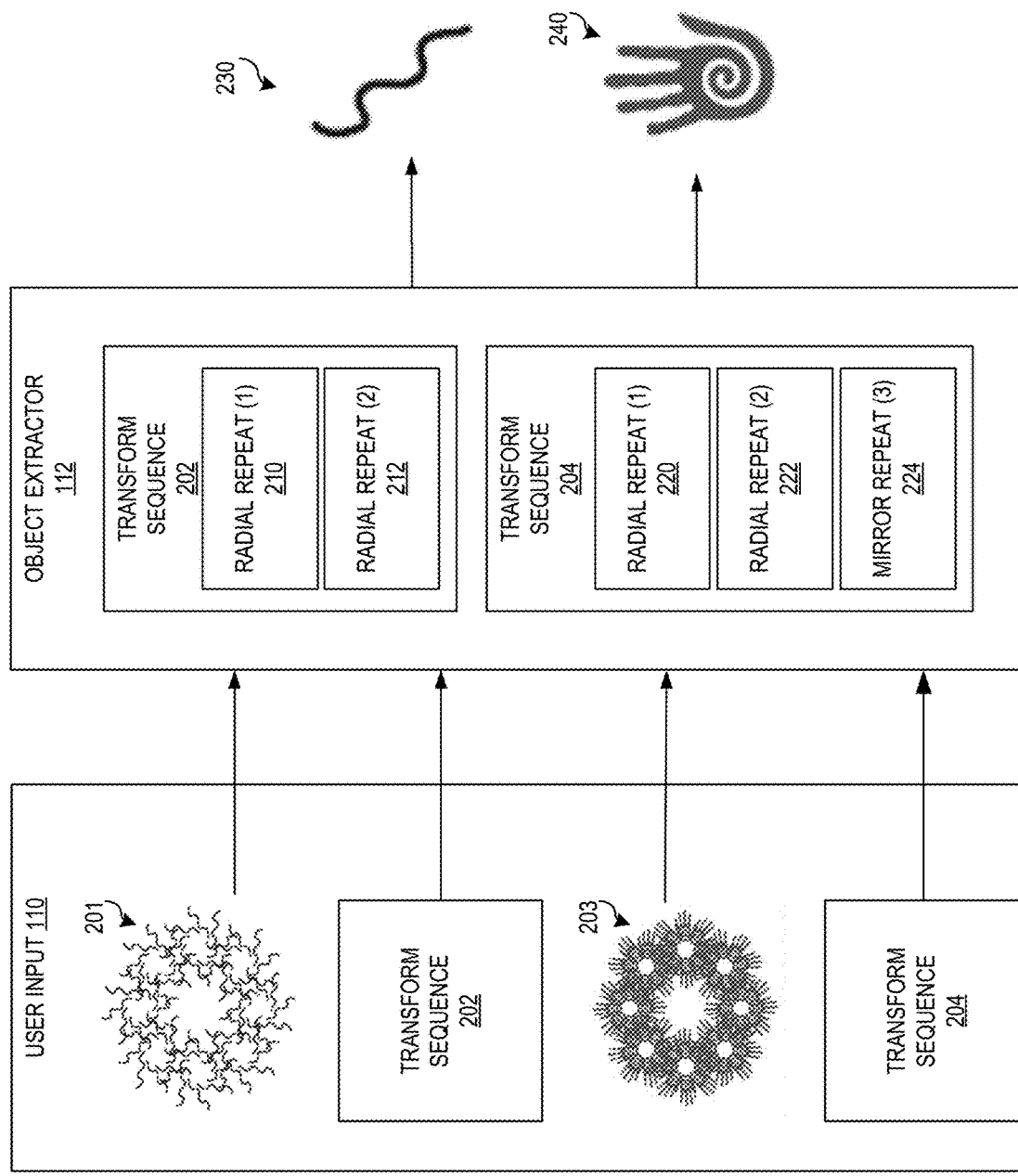
FIG. 2 illustrates an example of determining a primary object for complex objects using the transform sequence in accordance with one or more embodiments.

FIG. 2 illustrates an example of determining a primary object for complex objects using the transform sequence in accordance with one or more embodiments. The object extractor 112 can identify a transform sequence 202 identified by the transform sequence selection 120 that is associated with the first complex object 201 (as indicated by first complex object selection 106). In some embodiments, the transform sequence 202 can be stored in memory during creation of the first complex object 201, such as by using a metadata structure associated with the first complex object 201. In other embodiments, the transform sequence 202 can be extracted from the first complex object 201 by the object extractor 112. Similarly, the transform sequence 204 can be identified or extracted from the second complex object 203 (as indicated by second complex object selection 108).

To extract the primary object from each complex object, the object extractor 112 applies an inversion of the transform sequence to the complex object and outputs the primary object. As illustrated by FIG. 2, the object extractor 112 receives the first complex object 201 and a transform sequence 202. As depicted in the figure, the parenthetical notation "(1)", "(2)", or "(3)" indicate a position of the particular transform within a specific transform sequence. The transform sequence 202 includes radial repeat (1) 210 and radial repeat (2) 212. To generate the first primary object 230, the object extractor 112 applies an inverse of radial repeat (2) 212 and a subsequent inverse of radial repeat (1) 210 to the first complex object 201.

Similarly, for the second complex object 203, the object extractor 112 can identify a transform sequence 204 that is associated with the second complex object 203. The transform sequence 204 includes a radial repeat (1) 220, a radial repeat (2) 222, and a mirror repeat (3). To generate the second primary object, the object extractor 112 applies an inversion of the transform sequence 204 to the second complex object 203. For instance, the object extractor 112 applies object extractor applies an inverse of the mirror repeat (3) 224, radial repeat (2) 222 and a subsequent inverse of radial repeat (1) 220 to the second complex object 203 to produce the second primary object 240.

Figure 3:
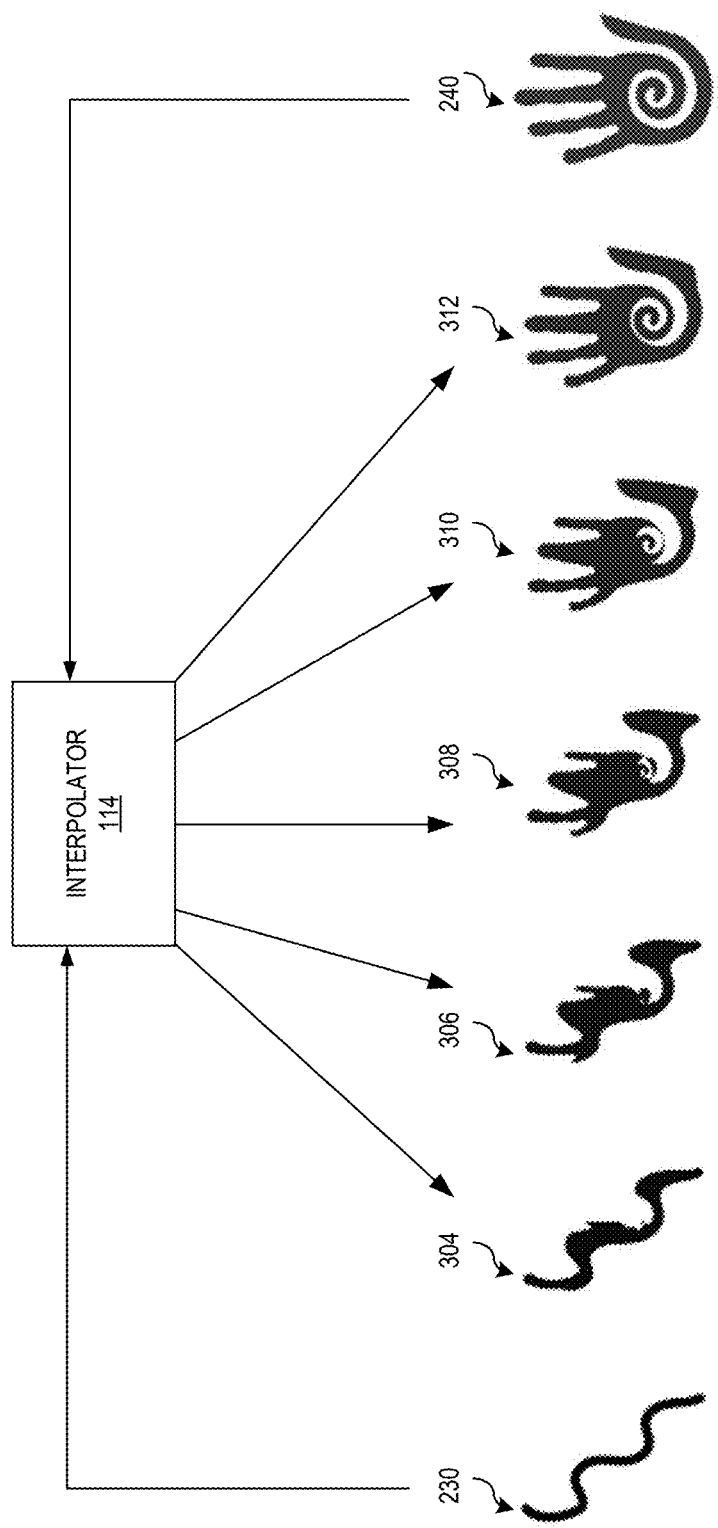
FIG. 3 depicts an example of blending two primary objects in accordance with one or more embodiments.

FIG. 3 depicts an example of blending two primary objects in accordance with one or more embodiments. The object extractor 112 extracts a first primary object 230 associated with the first complex object 201 (e.g., first complex object selection 106) and a second primary object 240 associated with the second complex object 203 (e.g., second complex object selection 108). The interpolator 114 performs a blending operation using the first primary object 230 and the second primary object 240. For example, the interpolator 114 generates a set of intermediate primary objects 304-312 that represent positions between the first primary object 230 and the second primary object 240 on an interpolation path. Although FIG. 3 depicts a linear interpolation with five intermediate complex objects (e.g., a linear spacing between each intermediate object), any number of intermediate objects or type of interpolation can be used.

In some embodiments, the interpolator 114 can use known points (e.g., shapes of the first primary object 230 and the second primary object 240) to predict values for the intermediate primary objects. In an example using linear interpolation such as that illustrated in FIG. 3, the interpolator 114 can compute a pixel difference between the first primary object 230 and the second primary object 240 and compute intermediate steps that define the pixels of the intermediate primary object. For an intermediate sequence having five steps as illustrated in FIG. 3, the first intermediate object 304 represents a blend of 16.666% of the second primary object 240 and 83.333% of the first primary object 230. The third intermediate object 308 represents a midpoint between the first primary object 230 and the second primary object 240.

Figure 4:
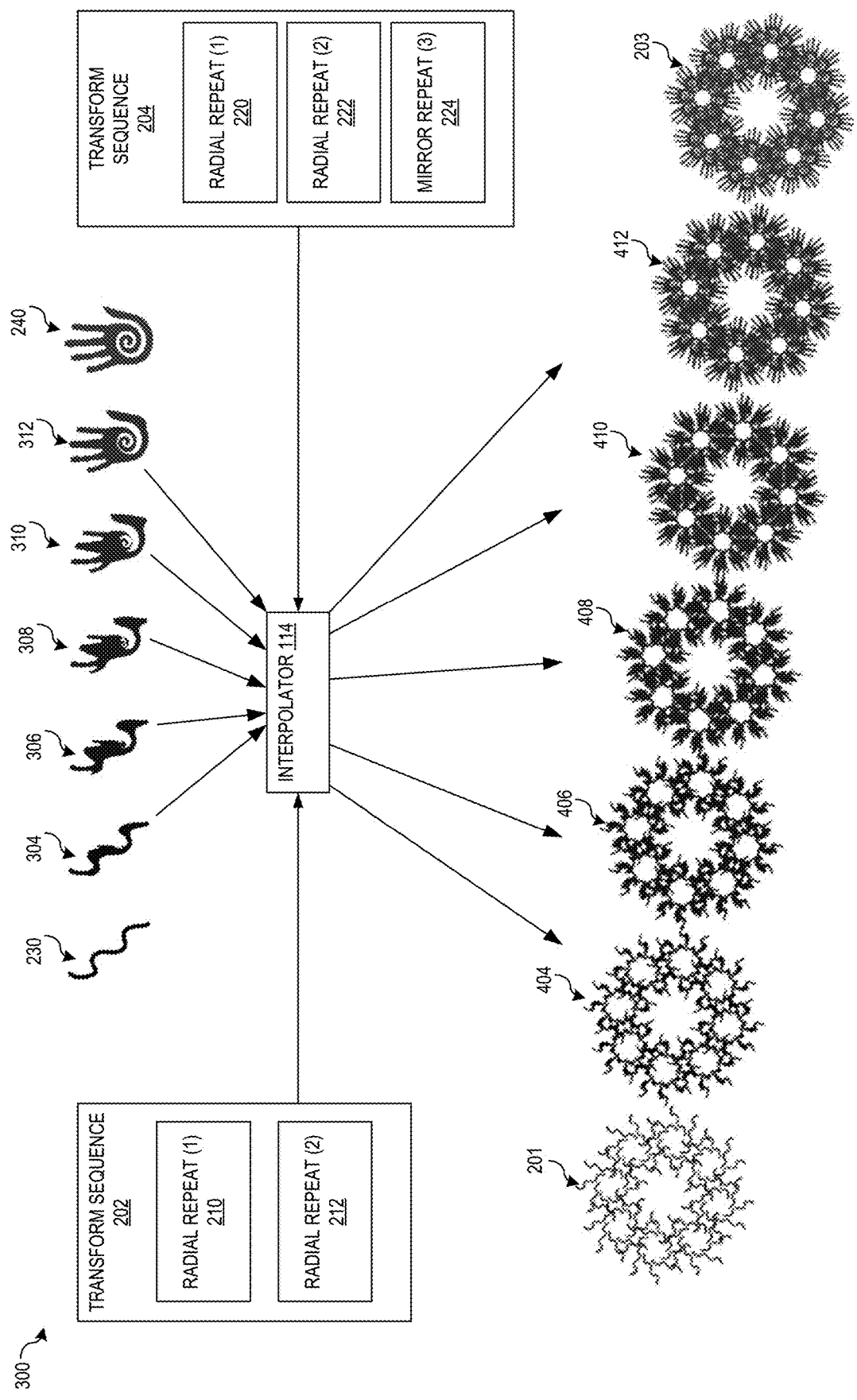
FIG. 4 illustrates an example of an interpolation using transform aware blend object generation in accordance with one or more embodiments.

FIG. 4 illustrates an example of an interpolation using a transform aware generator in accordance with one or more embodiments. For instance, the transform aware generator includes an interpolator 114 that produces intermediate complex objects that represent a blending of the first complex object 201 and the second complex object 203. As described above with regard to FIGS. 1-3, the object extractor identifies a first primary object 230 for a first complex object 201 and a second primary object 240 for a second complex object 203. The interpolator 114 performs a blending on the primary objects as described above to generate a set of intermediate primary objects 304-312.

The interpolator 114 generates an intermediate sequence by performing interpolation of the transform sequence 202 (including radial repeat (1) 210 and radial repeat (2) 212) and the transform sequence 204 (including radial repeat (1) 220, radial repeat (2) 222, and mirror repeat (3) 224) using the same number of steps as used during the blending described above (to generate the number of intermediate primary objects). By using the same number of steps during interpolation of the transform sequences and the primary objects, each intermediate primary object of 304-312 will have a corresponding intermediate transform sequence. During this interpolation, a stepwise interpolation is used due to a number of sequences being discrete. Because a geometric transform operation such as radial repeat (1) 210 or radial repeat (2) 212 cannot be subdivided, the interpolator can use thresholds to determine when to apply the discrete step (e.g., above 25% rather than at 16.66% or at 33.33%) if the number of geometric transforms does not match the number of steps. For example, the mirror repeat (3) 224 is included in the intermediate sequence that is used to form intermediate complex object 412/

The interpolator 114 applies the intermediate transform sequence to one of the intermediate primary objects 304-312 to generate intermediate complex objects 404-412. The intermediate complex objects 404-412 are representative of an accurate blending between the first complex object 201 and the second complex object 203. In particular, the intermediate complex objects 404-412 represent an accurate blending of both the primary objects (e.g., to retain intricacy of each primary object) and the transform sequences of the complex objects (e.g., maintaining the complexity of objects formed using transform sequences).

Figure 5:
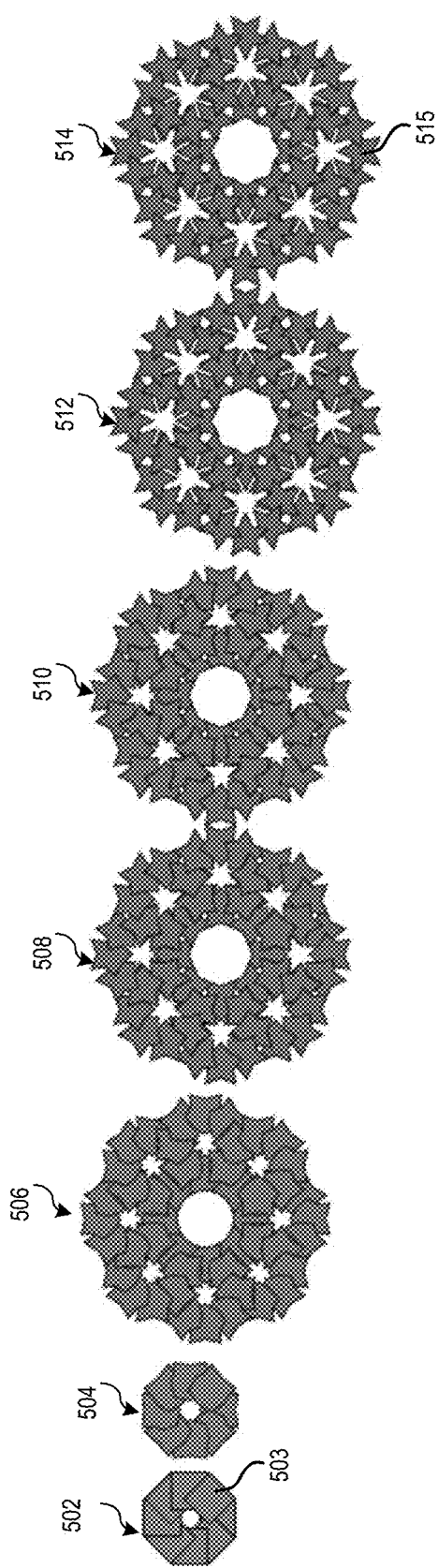
FIG. 5 depicts an example of an interpolation using transform aware blend object generation for two complex objects that have a scaling difference, in accordance with one or more embodiments.

FIG. 5 depicts an example of an interpolation using transform aware blend object generation for two complex objects that have a scaling difference, in accordance with one or more embodiments. As described above, the blending of the primary objects and interpolation of the transform sequences are performed independently. The independence allows the transform aware generator to perform the transform aware blend object generation with two complex objects that have a scaling difference by applying a scaling factor to steps of the transform sequence. As illustrated in FIG. 5, the first complex object 502 is made from a primary object that is a square 503. To generate the first complex object 502, the user has selected a radial repeat for a transform sequence. Applying the radial repeat replicates the square 503 around a center point of the first complex object 502. In some embodiments, as part of the radial repeat transform, the user selects both the primary object and the center point around which the object is repeated. The second complex object 514 is made from a primary object that is a star 515. To generate the second complex object 514, the user has selected a series of two radial repeats and a mirror repeat with a scaling factor that is different than the scaling factor used to generate the first complex object 502. Applying a first radial repeat, a second radial repeat, and a mirror repeat with a scaling factor generates the second complex object 514 including an inner circle of stars (e.g., a radial repeat applied to one star) and a circle having a larger radius that includes multiple circles of stars (e.g., a radial repeat applied to the inner circle of stars.

The transform aware generator blends the square and the star to generate the intermediate primary objects to compose intermediate complex objects 504-512. The transform aware generator applies the intermediate transform sequence to generate the intermediate complex objects 504-512. The difference between the scaling factors can be applied in one step between two intermediate complex objects (e.g., 504 and 506), or divided into smaller scaling factors applied between multiple steps.

As illustrated in FIG. 5, the primary objects are blended into intermediate objects. The blending changes the first primary object changes from a square 503 at 502 to the second primary object of a star 515 at 514 with five blended intermediate primary objects 504-512. At 504, the intermediate primary object represents a blend of 25% star and 75% square. At 506, the intermediate primary object represents a blend of 50% star and 50% square. At 508, the intermediate primary object represents a blend of 75% star and 25% square. At 510, the intermediate primary object represents a blend of 75% square and 25% star. At 512, the intermediate primary object represents a blend of 0% square and 100% star.

As further illustrated by FIG. 5, the transform sequence of the first complex object 502 is a single radial repeat. The transform sequence of the second complex object 514 is a first radial repeat, a second radial repeat, and a mirror repeat. The intermediate transform sequence is interpolated between the intermediate complex objects. At 504, the transform sequence is a radial repeat. At 506, the intermediate transform sequence is a first radial repeat and a second radial repeat, and at 508-512, the intermediate transform sequence is a first radial repeat, a second radial repeat, and a mirror repeat.

Figure 6:
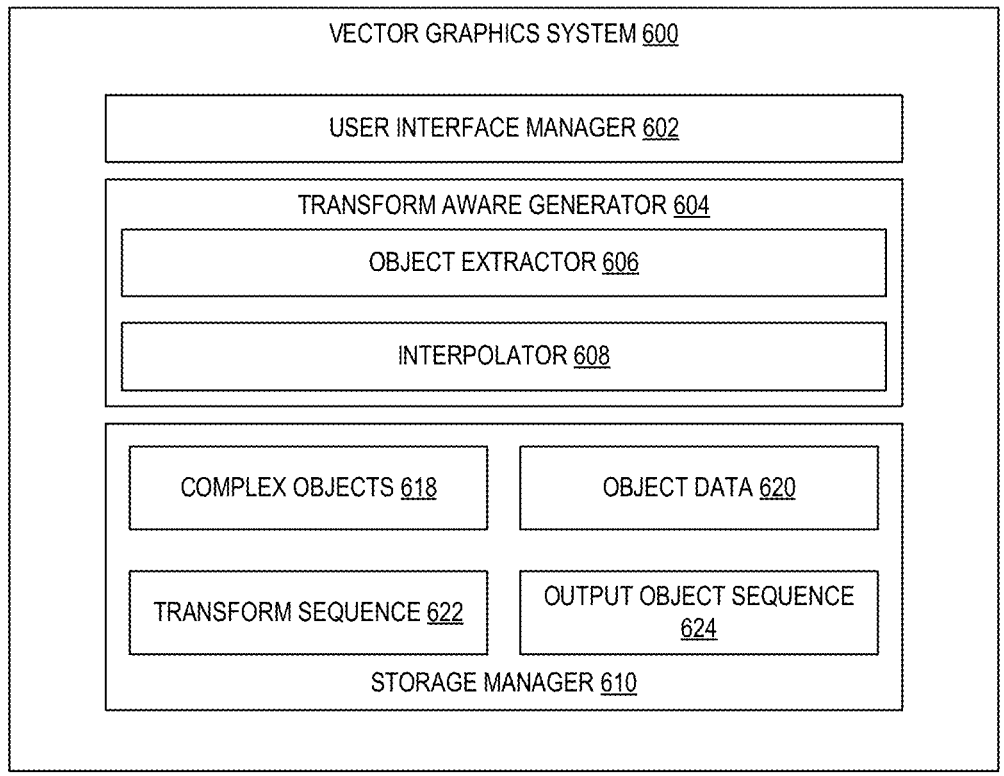
FIG. 6 illustrates a schematic diagram of a vector graphics system in accordance with one or more embodiments.

FIG. 6 illustrates a schematic diagram of a vector graphics system including a transform aware generator in accordance with one or more embodiments. As shown, the vector graphics system 600 may include but is not limited to user interface manager 602, transform aware generator 604, and storage manager 610. The transform aware generator 604 includes object extractor 606 and interpolator 608. The storage manager 610 includes complex objects 618, object data 620, transform sequence 622, and output object sequences 624.

As illustrated in FIG. 6, the vector graphics system 600 includes a user interface manager 602. For example, the user interface manager 602 allows users to select complex objects for input to the vector graphics system 600. In some embodiments, the user interface manager 602 provides a user interface through which the user can upload the complex objects 618 which represent the complex objects that include geometric repeat operations to be blended, as discussed above. Alternatively, or additionally, the user interface manager 602 may enable the user to download the output object sequences 624 or object data 620 from a local or remote storage location (e.g., by providing an address (e.g., a URL or other endpoint) associated with complex objects 618). In some embodiments, the user interface manager 602 can enable a user to link a library of complex objects including two complex objects to be blended and provide the complex objects to the vector graphics system 600.

Additionally, the user interface manager 602 allows users to request the vector graphics system 600 to perform a blending operation on complex objects 618. For example, the users can apply a transform sequence or adjust an existing transform sequence of either of the complex objects. The vector graphics system 600 can update the blending operation using the adjustment to the transform sequences. In some embodiments, the user interface manager 602 enables the user to view the resulting output object sequence 624 and/or request further edits to the output object sequence 624 such as adjusting the number of intermediate complex objects between the two complex objects.

As illustrated in FIG. 6, the transform aware generator 604 includes an object extractor 606. The object extractor 606 can receive complex objects and transform sequences to blend the complex objects. For example, the complex object can include a transform sequence in the transform sequence applied to a primary object. Each transform sequence can include one or more geometric repeat operation (e.g., radial, mirror, grid). The object extractor 606 can extract the primary object from each complex object by applying an inversion of the transform sequence. The inversion of the transform sequence is performed by applying an inverse operation of each geometric repeat operation in the transform sequence in reverse order to the transform sequence.

As illustrated in FIG. 6, the transform aware generator 604 includes an interpolator 608. The interpolator 608 receives the first primary object and the second primary object that each correspond to a complex object. The interpolator 608 performs a blending operation to create a number of intermediate primary objects. In some embodiments, the blending operation is a linear interpolation between the first primary object and the second primary object. The interpolator 608 also performs an interpolation between the transform sequences associated with transform sequences of each of the complex objects. For example, the interpolator can determine that a first transform sequence may include a single radial repeat while the second transform sequence includes two radial repeats and a mirror repeat. The interpolator 608 generates a set of intermediate sequences for each primary object to ensure that the number of intermediate primary objects is the same as the number of intermediate sequences. The interpolator 608 generates intermediate sequences by performing an interpolation of the geometric repeat operations in each transform sequence. In one example, a first transform sequence has a single geometric repeat operation of a radial repeat and a second transform sequence has three geometric repeat operations in a sequence of radial repeat, radial repeat, and mirror repeat. The interpolator generates intermediate sequences including a first intermediate sequence that includes a single radial repeat, a second intermediate sequence that includes a radial repeat followed by a subsequent radial repeat, and a third intermediate sequence that includes a radial repeat followed by a subsequent radial repeat followed by a mirror repeat.

As illustrated in FIG. 6, the vector graphics system 600 also includes the storage manager 610. The storage manager 610 maintains data for the vector graphics system 600. The storage manager 610 can maintain data of any type, size, or kind as necessary to perform the functions of the vector graphics system 600. The storage manager 610, as shown in FIG. 6, includes the complex objects 618. The complex objects 618 can include a plurality of objects that include a primary object with one or more geometric repeat operations that are applied to the primary object, as discussed in additional detail above. In particular, in one or more embodiments, the complex objects 618 include compatible pairs of complex objects as described above or selected complex objects received from the user via the user interface manager 602.

As further illustrated in FIG. 6, the storage manager 610 also includes object data 620. Object data 620 can include information for any object parameters utilized by the vector graphics system 600. For example, object data 620 includes bounding box parameters, a number of intermediate steps for interpolation, primary object data, intermediate primary objects, intermediate complex objects, and instance transformation matrices.

As further illustrated in FIG. 6, the storage manager 610 also includes transform sequence 622. The transform sequence 622 may include a plurality of sequences of geometric repeat operations, including a transform sequence associated with each of the complex objects 618. The transform sequence 622 may intermediate transform sequences that include the intermediate sequences associated with intermediate complex objects.

As further illustrated in FIG. 6, the storage manager 610 also includes output object sequence 624. The output object sequence 624 may include the first complex objects, the second complex objects and the intermediate complex objects, as discussed above. The output object sequence 624 can include a plurality of outputs that can be stored for additional processing or provided to another computing system.

Each of the components 602-610 of the vector graphics system 600 and their corresponding elements (as shown in FIG. 6) may be in communication with one another using any suitable communication technologies. It will be recognized that although components 602-610 and their corresponding elements are shown to be separate in FIG. 6, any of components 602-610 and their corresponding elements may be combined into fewer components, such as into a single facility or module, divided into more components, or configured into different components that may serve a particular embodiment.

The components 602-610 and their corresponding elements can comprise software, hardware, or both. For example, the components 602-610 and their corresponding elements can comprise one or more instructions stored on a computer-readable storage medium and executable by processors of one or more computing devices. When executed by the one or more processors, the computer-executable instructions of the vector graphics system 600 can cause a client device and/or a server device to perform the methods described herein. Alternatively, the components 602-610 and their corresponding elements can comprise hardware, such as a special purpose processing device to perform a certain function or group of functions. Additionally, the components 602-610 and their corresponding elements can comprise a combination of computer-executable instructions and hardware.

Furthermore, the components 602-610 of the vector graphics system 600 may, for example, can be implemented as one or more stand-alone applications, as one or more modules of an application, as one or more plug-ins, as one or more library functions or functions that may be called by other applications, and/or as a cloud-computing model. Thus, the components 602-610 of the vector graphics system 600 may be implemented as a stand-alone application, such as a desktop or mobile application. Furthermore, the components 602-610 of the vector graphics system 600 may be implemented as one or more web-based applications hosted on a remote server. Alternatively, or additionally, the components of the vector graphics system 600 may be implemented in a suit of mobile device applications or "apps."

Figure 7:
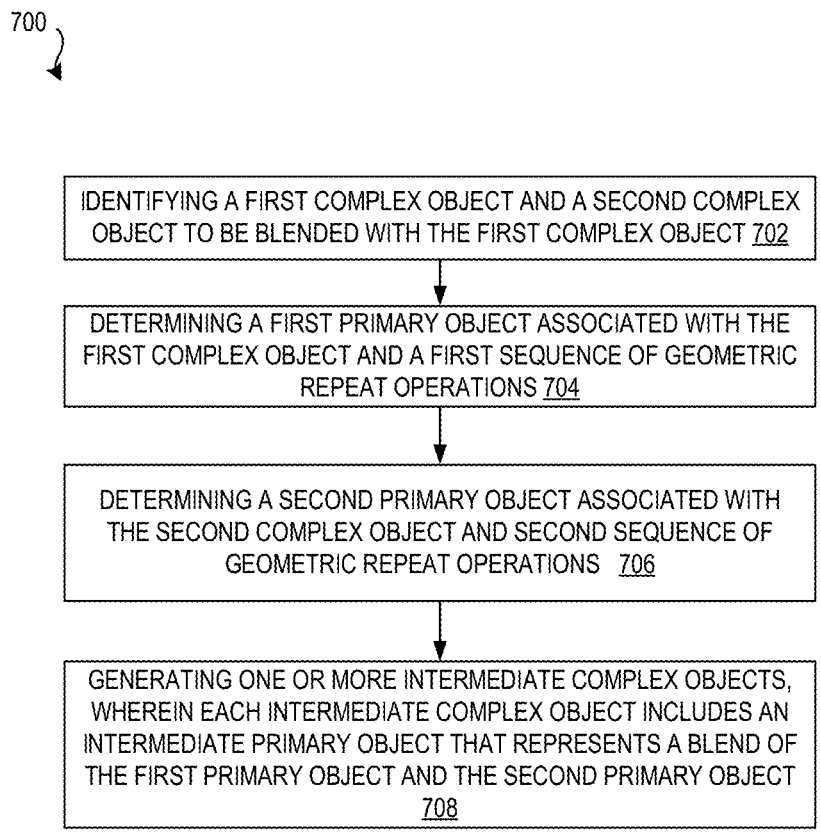
FIG. 7 illustrates a flowchart of a series of acts in a method of transform aware blend object generation in accordance with one or more embodiments.

FIGS. 1-6, the corresponding text, and the examples, provide a number of different systems and devices that allows a user to perform complex object blending using the transform aware generator system. In addition to the foregoing, embodiments can also be described in terms of flowcharts comprising acts and steps in a method for accomplishing a particular result. For example, FIG. 7 illustrates a flowchart of an exemplary method in accordance with one or more embodiments. The method described in relation to FIG. 7 may be performed with fewer or more steps/acts or the steps/acts may be performed in differing orders. Additionally, the steps/acts described herein may be repeated or performed in parallel with one another or in parallel with different instances of the same or similar steps/acts.

FIG. 7 illustrates a flowchart 700 of a series of acts in a method of perform complex object blending involving geometric repeat operations in accordance with one or more embodiments. In one or more embodiments, the method 700 is performed in a digital medium environment that includes the vector graphics system 600. The method 700 is intended to be illustrative of one or more methods in accordance with the present disclosure and is not intended to limit potential embodiments. Alternative embodiments can include additional, fewer, or different steps than those articulated in FIG. 7.

As illustrated in FIG. 7, the method 700 includes an act 702 of identifying a first complex object and a second complex object to be blended with the first complex object. The transform aware generator identifies pairs of complex objects including a first complex object and a second complex object that are compatible to be blended. The transform aware generator can receive a selection from a user indicating a selection of the first complex object and a selection of the second complex object. For example, the transform aware generator may identify a pair of complex objects for potential blending and request input from the user that determines the starting point (i.e., the first complex object) and end point (i.e., the second complex object) of the blending operation.

As illustrated in FIG. 7, the method 700 includes an act 704 of determining a first primary object associated with the first complex object and a first sequence of geometric repeat operations. As described above, the primary object is any component shape that has one or more geometric repeat transforms applied to form each complex object. In some embodiments, the object extractor uses a transform sequence that includes geometric repeat operations applied to a primary object to generate a corresponding complex object. An inversion of each geometric repeat operation in the transform sequence is applied to the complex object to identify the primary object. In some embodiments, the object extractor may perform object detection on one or both of the complex objects to identify the primary object. After performing object detection, the object extractor validates the primary object by testing a sequence of geometric repeat operations that, when applied to the primary object, generate the complex object.

As illustrated in FIG. 7, the method 700 includes an act 706 of determining a second primary object associated with the second complex object and second sequence of geometric repeat operations. Similar to the operations of act 704, the second primary object is determined using a transform sequence associated with the second complex object. The object extractor can identify a sequence of geometric repeat operations in the transform sequence that is associated with the second complex object. The object extractor can apply an inversion of each geometric repeat operation in the transform sequence to the complex object to generate the second primary object.

As illustrated in FIG. 7, the method 700 includes an act 708 of generating one or more intermediate primary objects by applying a blending operation to the first primary object and the second primary object. For example, the interpolator blends the first primary object and the second primary object such as by a linear interpolation. Each step of the linear interpolation generates an intermediate primary object. The interpolator generates the intermediate primary objects using a number of interpolation steps between the first primary object and the second primary object, which can be configured by the user of the transform aware generator system. The interpolator can adjust the intermediate primary objects in response to change the number of interpolation steps requested by the user. The interpolator generates intermediate sequences for each of the intermediate primary objects by interpolating between the transform sequences associated with the first complex object and the second complex object. The interpolator generates an intermediate complex object using a combination of an intermediate primary object and a corresponding intermediate sequence. The interpolator applies the intermediate sequence to the intermediate primary object to generate the intermediate complex object. During the interpolation, the interpolator computes a minimum area bounding box for each intermediate complex object by finding a convex hull of points encompassing the intermediate complex object. The transform aware generator compares the minimum area bounding box for sequential intermediate complex objects such as a second intermediate object and a third intermediate object. The transform aware generator computes a difference between the minimum area bounding boxes to determine if the difference is within a threshold difference. The transform aware generator computes an updated instance transformation matrix when the difference is greater than the threshold difference. The transform aware generator applies the instance transformation matrix to the intermediate complex objects after the interpolator has generated the intermediate complex object. If the difference is less than the threshold of dimensions, the transform aware generator can apply the same instance transformation matrix previously computed.

Figure 8:
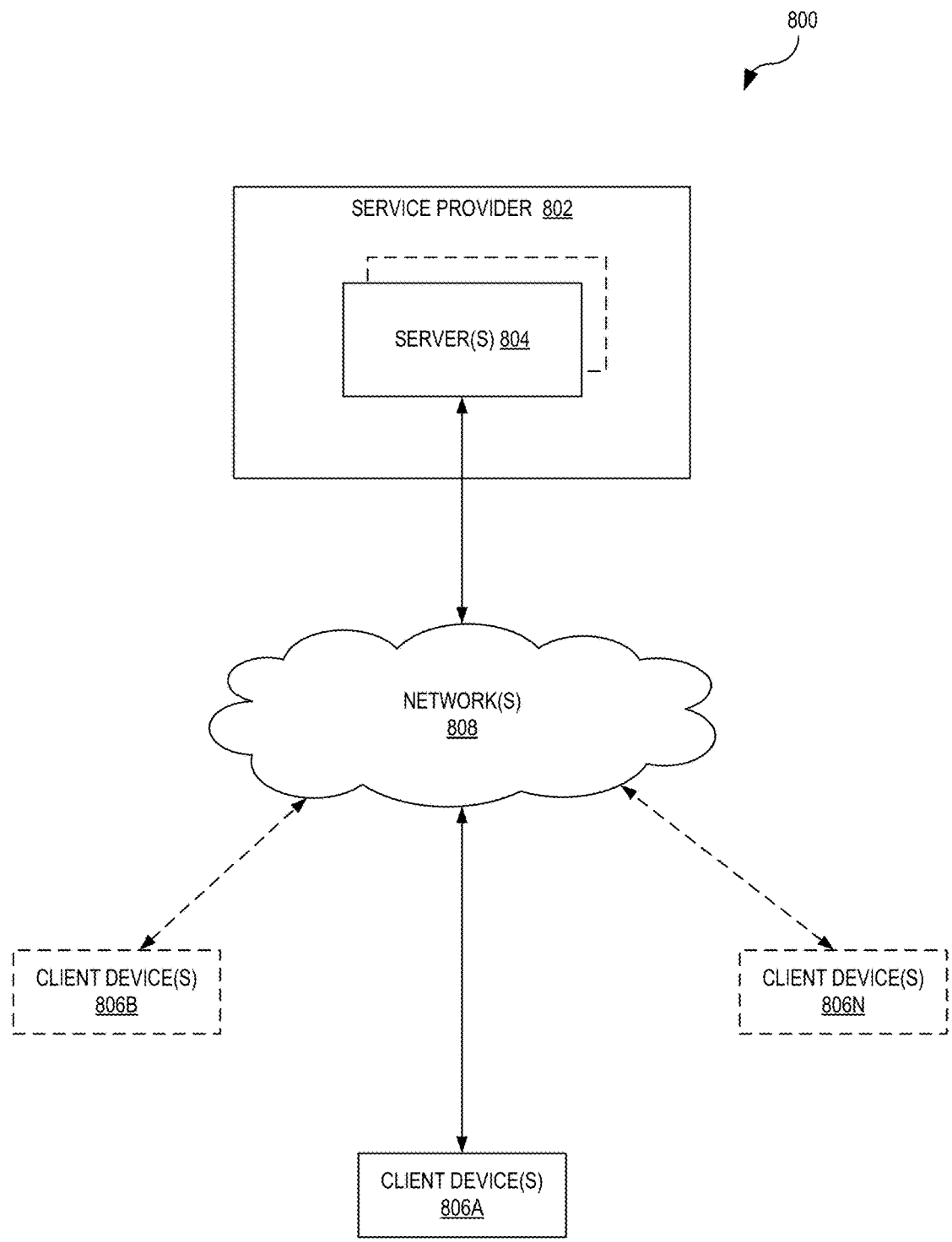
FIG. 8 illustrates a schematic diagram of an exemplary environment in which the vector graphics system can operate in accordance with one or more embodiments.

FIG. 8 illustrates a schematic diagram of an exemplary environment 800 in which the vector graphics system 600 can operate in accordance with one or more embodiments. In one or more embodiments, the environment 800 includes a service provider 802 which may include one or more servers 804 connected to a plurality of client devices 806A-806N via one or more networks 808. The client devices 806A-806N, the one or more networks 808, the service provider 802, and the one or more servers 804 may communicate with each other or other components using any communication platforms and technologies suitable for transporting data and/or communication signals, including any known communication technologies, devices, media, and protocols supportive of remote data communications, examples of which will be described in more detail below with respect to FIG. 9.

Although FIG. 8 illustrates a particular arrangement of the client devices 806A-806N, the one or more networks 808, the service provider 802, and the one or more servers 804, various additional arrangements are possible. For example, the client devices 806A-806N may directly communicate with the one or more servers 804, bypassing the network 808. Or alternatively, the client devices 806A-806N may directly communicate with each other. The service provider 802 may be a public cloud service provider which owns and operates their own infrastructure in one or more data centers and provides this infrastructure to customers and end users on demand to host applications on the one or more servers 804. The servers may include one or more hardware servers (e.g., hosts), each with its own computing resources (e.g., processors, memory, disk space, networking bandwidth, etc.) which may be securely divided between multiple customers, each of which may host their own applications on the one or more servers 804. In some embodiments, the service provider may be a private cloud provider which maintains cloud infrastructure for a single organization. The one or more servers 804 may similarly include one or more hardware servers, each with its own computing resources, which are divided among applications hosted by the one or more servers for use by members of the organization or their customers.

Similarly, although the environment 800 of FIG. 8 is depicted as having various components, the environment 800 may have additional or alternative components. For example, the environment 800 can be implemented on a single computing device with the vector graphics system 600. In particular, the vector graphics system 600 may be implemented in whole or in part on the client device 802A.

As illustrated in FIG. 8, the environment 800 may include client devices 806A-806N. The client devices 806A-806N may comprise any computing device. For example, client devices 806A-806N may comprise one or more personal computers, laptop computers, mobile devices, mobile phones, tablets, special purpose computers, TVs, or other computing devices, including computing devices described below with regard to FIG. 9. Although three client devices are shown in FIG. 8, it will be appreciated that client devices 806A-806N may comprise any number of client devices (greater or smaller than shown).

Moreover, as illustrated in FIG. 8, the client devices 806A-806N and the one or more servers 804 may communicate via one or more networks 808. The one or more networks 808 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 808 may be any suitable network over which the client devices 806A-806N may access service provider 802 and server 804, or vice versa. The one or more networks 808 will be discussed in more detail below with regard to FIG. 9.

In addition, the environment 800 may also include one or more servers 804. The one or more servers 804 may generate, store, receive, and transmit any type of data, including complex objects 618, object data 620, transform sequence 622, output object sequence 624, or other information. For example, a server 804 may receive data from a client device, such as the client device 806A, and send the data to another client device, such as the client device 802B and/or 802N. The server 804 can also transmit electronic messages between one or more users of the environment 800. In one example embodiment, the server 804 is a data server. The server 804 can also comprise a communication server or a web-hosting server. Additional details regarding the server 804 will be discussed below with respect to FIG. 9.

As mentioned, in one or more embodiments, the one or more servers 804 can include or implement at least a portion of the vector graphics system 600. In particular, the vector graphics system 600 can comprise an application running on the one or more servers 804 or a portion of the vector graphics system 600 can be downloaded from the one or more servers 804. For example, the vector graphics system 600 can include a web hosting application that allows the client devices 806A-806N to interact with content hosted at the one or more servers 804. To illustrate, in one or more embodiments of the environment 800, one or more client devices 806A-806N can access a webpage supported by the one or more servers 804. In particular, the client device 806A can run a web application (e.g., a web browser) to allow a user to access, view, and/or interact with a webpage or website hosted at the one or more servers 804.

Upon the client device 806A accessing a webpage or other web application hosted at the one or more servers 804, in one or more embodiments, the one or more servers 804 can provide access to one or more complex objects, geometric repeat operations, or primary objects (e.g., complex objects 618, a library of primary objects, or a library of geometric repeat operations) stored at the one or more servers 804. Moreover, the client device 806A can receive a request (i.e., via user input) to perform a blending operation on two complex objects and provide the request to the one or more servers 804. Upon receiving the request, the one or more servers 804 can automatically perform the methods and processes described above to generate the output object sequence including the intermediate complex objects. The one or more servers 804 can provide all or portions of the output object sequence, to the client device 806A for display to the user.

As just described, the vector graphics system 600 may be implemented in whole, or in part, by the individual elements 802-808 of the environment 800. It will be appreciated that although certain components of the vector graphics system 600 are described in the previous examples with regard to particular elements of the environment 800, various alternative implementations are possible. For instance, in one or more embodiments, the vector graphics system 600 is implemented on any of the client devices 806A-806N. Similarly, in one or more embodiments, the vector graphics system 600 may be implemented on the one or more servers 804. Moreover, different components and functions of the vector graphics system 600 may be implemented separately among client devices 806A-806N, the one or more servers 804, and the network 808.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures that can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, that both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
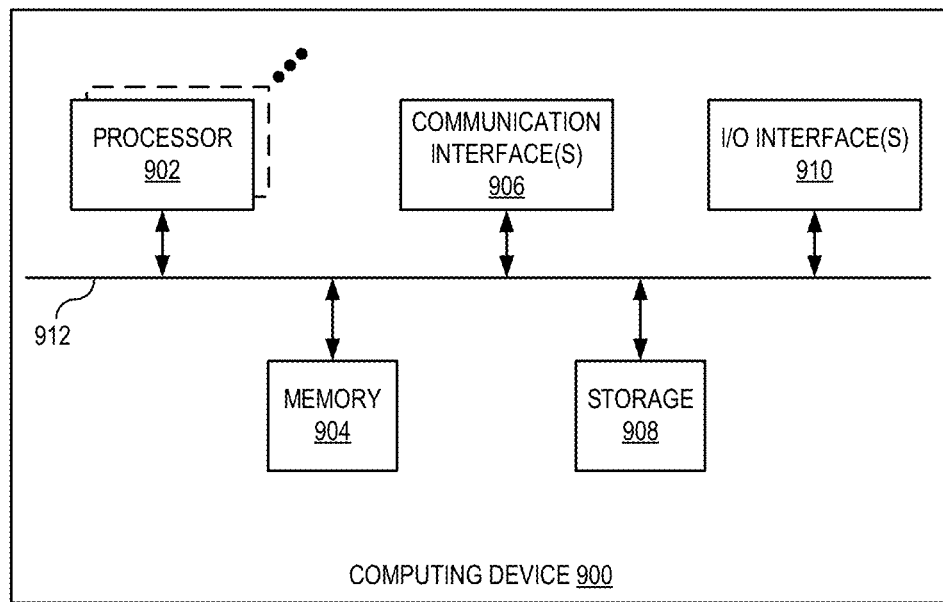
FIG. 9 illustrates a block diagram of an exemplary computing device in accordance with one or more embodiments.

FIG. 9 illustrates, in block diagram form, an exemplary computing device 900 that may be configured to perform one or more of the processes described above. One will appreciate that one or more computing devices such as the computing device 900 may implement the vector graphics system 600. As shown by FIG. 9, the computing device can comprise a processor 902, memory 904, one or more communication interfaces 906, a storage device 908, and one or more I/O devices/interfaces 910. In certain embodiments, the computing device 900 can include fewer or more components than those shown in FIG. 9. Components of computing device 900 shown in FIG. 9 will now be described in additional detail.

In particular embodiments, processor(s) 902 includes hardware for executing instructions, such as those making up a computer program. As an example, and not by way of limitation, to execute instructions, processor(s) 902 may retrieve (or fetch) the instructions from an internal register, an internal cache, memory 904, or a storage device 908 and decode and execute them. In various embodiments, the processor(s) 902 may include one or more central processing units (CPUs), graphics processing units (GPUs), field programmable gate arrays (FPGAs), systems on chip (SoC), or other processor(s) or combinations of processors.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 904 may be internal or distributed memory.

The computing device 900 can further include one or more communication interfaces 906. A communication interface 906 can include hardware, software, or both. The communication interface 906 can provide one or more interfaces for communication (such as, for example, packet-based communication) between the computing device and one or more other computing devices 900 or one or more networks. As an example, and not by way of limitation, communication interface 906 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can comprise hardware, software, or both that couples components of computing device 900 to each other.

The computing device 900 includes a storage device 908 which includes storage for storing data or instructions. As an example, and not by way of limitation, storage device 908 can comprise a non-transitory storage medium described above. The storage device 908 may include a hard disk drive (HDD), flash memory, a Universal Serial Bus (USB) drive or a combination of these or other storage devices. The computing device 900 also includes one or more input or output ("I/O") devices/interfaces 910, which are provided to allow a user to provide input to (such as user strokes), receive output from, and otherwise transfer data to and from the computing device 900. These I/O devices/interfaces 910 may include a mouse, keypad or a keyboard, a touch screen, camera, optical scanner, network interface, modem, other known I/O devices or a combination of such I/O devices/interfaces 910. The touch screen may be activated with a stylus or a finger.

The I/O devices/interfaces 910 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 910 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:
   identifying a first complex object and a second complex object to be blended with the first complex object based on a compatibility between the first complex object and the second complex object determined by their corresponding transform sequences;
   determining a first primary object associated with the first complex object based on a first transform sequence of geometric repeat operations applied to the first primary object to generate the first complex object;
   determining a second primary object associated with the second complex object based on a second transform sequence of geometric repeat operations applied to the second primary object to generate the second complex object; and
   generating one or more intermediate complex objects, wherein each intermediate complex object includes an intermediate primary object that represents a blend of the first primary object and the second primary object.

2. The method of claim 1, wherein determining the first primary object associated with the first complex object based on the first transform sequence of geometric repeat operations comprises:
　　determining one or more geometric repeat operations that when performed on the first primary object, generate the first complex object.

3. The method of claim 1, wherein generating the one or more intermediate complex objects comprises:
　　interpolating the first transform sequence of geometric repeat operations and the second transform sequence of geometric repeat operations;
　　producing, based on the interpolation, a set of intermediate sequences including one or more geometric repeat operations, wherein each intermediate sequence in the set of intermediate sequences corresponds to the intermediate primary object; and
　　generating the one or more intermediate complex objects by applying each intermediate sequence to the intermediate primary object.

4. The method of claim 1, wherein generating one or more intermediate primary objects by applying a blending operation to the first primary object and the second primary object comprises:
　　performing a linear interpolation on the first primary object and the second primary object, the linear interpolation having a number of steps that defines the number of intermediate primary objects.

5. The method of claim 1, wherein determining the first primary object associated with the first complex object comprises:
　　identifying the first transform sequence of geometric repeat operations;
　　generating an inverse sequence of geometric repeat operations; and
　　applying the inverse sequence to the first complex object to obtain the first primary object.

6. The method of claim 1 further comprising:
　　determining the compatibility between the first complex object and the second complex object using the first transform sequence of geometric repeat operations and the second transform sequence of geometric repeat operations, wherein the compatibility is confirmed when each geometric repeat operation of the first transform sequence and the second transform sequence is an identical operation or the first transform sequence is a subset of the second transform sequence.

7. The method of claim 1 further comprising:
　　determining a difference of at least one dimension between the first complex object and the second complex object; and
　　applying an interpolation of the difference to the one or more intermediate complex objects.

8. A non-transitory computer-readable medium storing executable instructions, which when executed by a processing device, causes the processing device to perform operations comprising:
　　identifying a first complex object and a second complex object to be blended with the first complex object based on a compatibility between the first complex object and the second complex object determined by their corresponding transform sequences;
　　determining a first primary object associated with the first complex object based on a first transform sequence of geometric repeat operations applied to the first primary object to generate the first complex object;
　　determining a second primary object associated with the second complex object based on a second transform sequence of geometric repeat operations applied to the second primary object to generate the second complex object; and
　　generating one or more intermediate complex objects including an intermediate primary object that represents a blend of the first primary object and the second primary object.

9. The non-transitory computer-readable medium of claim 8, wherein the instructions for determining the first primary object associated with the first complex object based on the first transform sequence of geometric repeat operations comprise instructions which, when executed by the processing device further cause the processing device to perform operations comprising:
　　determining one or more geometric repeat operations that when performed on the first primary object, generate the first complex object.

10. The non-transitory computer-readable medium of claim 8, wherein the instructions for generating one or more intermediate complex objects comprise instructions which, when executed by the processing device further cause the processing device to perform operations comprising:
　　interpolating the first transform sequence of geometric repeat operations and the second transform sequence of geometric repeat operations;
　　producing, based on the interpolation, a set of intermediate sequences including one or more geometric repeat operations, wherein each intermediate sequence in the set of intermediate sequences corresponds to an intermediate primary object of the intermediate primary object; and
　　generating the one or more intermediate complex objects by applying each intermediate sequence to the intermediate primary object.

11. The non-transitory computer-readable medium of claim 8, the instructions for generating one or more intermediate primary objects by applying a blending operation to the first primary object and the second primary object comprise instructions which, when executed by the processing device further cause the processing device to perform operations comprising:
　　performing a linear interpolation on the first primary object and the second primary object, the linear interpolation having a number of steps that defines the number of intermediate primary objects.

12. The non-transitory computer-readable medium of claim 8, the instructions for determining the first primary object associated with the first complex object comprise instructions which, when executed by the processing device further cause the processing device to perform operations comprising:
　　identifying the first transform sequence of geometric repeat operations using a transform sequence;
　　generating an inverse sequence of geometric repeat operations; and
　　applying the inverse sequence to the first complex object.

13. The non-transitory computer-readable medium of claim 8, the instructions further comprising instructions which when executed by the processing device further cause the processing device to perform operations comprising:
　　determining the compatibility between the first complex object and the second complex object using the first transform sequence of geometric repeat operations and the second transform sequence of geometric repeat operations, wherein the compatibility is confirmed when each geometric repeat operation of the first transform sequence and the second transform sequence is an identical operation or the first transform sequence is a subset of the second transform sequence.

14. The non-transitory computer-readable medium of claim 8, the instructions further comprising instructions which, when executed by the processing device further cause the processing device to perform operations comprising:
determining a difference of at least one dimension between the first complex object and the second complex object; and
applying an interpolation of the difference to the intermediate complex object.

15. A system comprising:
a memory component; and
a processing device coupled to the memory component, the processing device to perform operations comprising:
identifying a first complex object that is formed by applying a first transform sequence to a first primary object, the first transform sequence including a first series of geometric repeat operations;
identifying a second complex object that is formed by applying a second transform sequence to a second primary object, the second transform sequence including a second series of geometric repeat operations, wherein the second transform sequence is compatible with the first transform sequence;
generating one or more intermediate primary objects by applying a blending operation to the first primary object and the second primary object;
generating a set of intermediate transform sequences by performing an interpolation of the first transform sequence and the second transform sequence; and
applying an intermediate transform of the set of intermediate transform sequences to the intermediate primary object of the one or more intermediate primary objects.

16. The system of claim 15, wherein the first primary object is associated with the first complex object and the first transform sequence, wherein applying the first transform sequence to the first primary object generates the first complex object.

17. The system of claim 15, the operation for generating one or more intermediate primary objects by applying a blending operation to the first primary object and the second primary object comprise operations further causing the processing device to perform operations comprising:
performing a linear interpolation on the first primary object and the second primary object, the linear interpolation having a number of steps that defines the number of intermediate primary objects.

18. The system of claim 15, operations further comprising:
determining the first primary object by:
identifying the first series of geometric repeat operations of the first complex object;
generating an inverse sequence of geometric repeat operations; and
applying the inverse sequence to the first complex object to obtain the first primary object.

19. The system of claim 15, the operations further comprising:
determining the compatibility between the first complex object and the second complex object using the first transform sequence and the second transform sequence, wherein the compatibility is confirmed when each geometric repeat operation of the first transform sequence and the second transform sequence is an identical operation or the first transform sequence is a subset of the second transform sequence.

20. The system of claim 15, the operations further comprising:
determining a difference of at least one dimension between the first complex object and the second complex object; and
applying an interpolation of the difference to the intermediate transform or the intermediate primary object.

* * * * *